Figure 1:
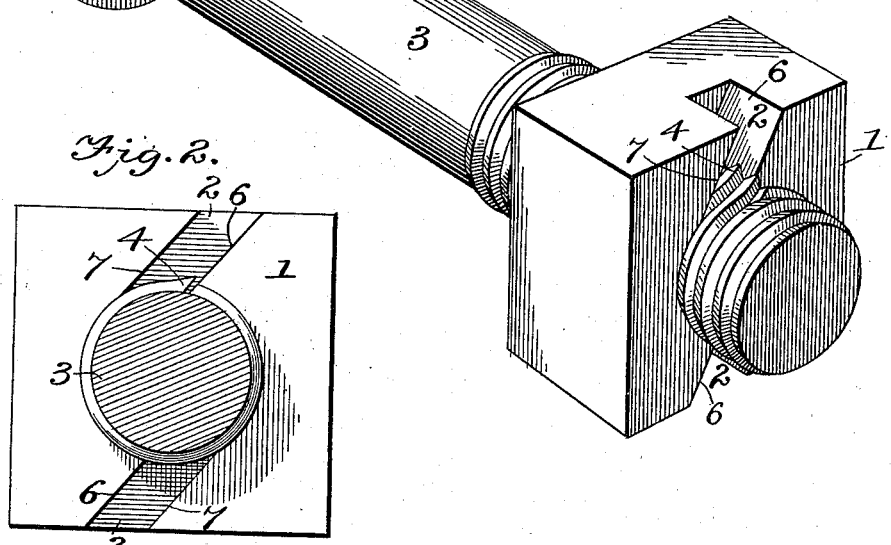

(No Model.)

J. W. SMITH.
NUT LOCK.

No. 591,062.   Patented Oct. 5, 1897.

Witnesses
Edwin G. McKee
J. F. Riley

Inventor
John W. Smith
By his Attorneys,
C. A. Snow & Co.

United States Patent Office.

JOHN W. SMITH, OF HOLGATE, OHIO, ASSIGNOR OF ONE-HALF TO E. HUBER, OF MARION, OHIO.

NUT-LOCK.

SPECIFICATION forming part of Letters Patent No. 591,062, dated October 5, 1897.

Application filed March 23, 1897. Serial No. 628,921. (No model.)

*To all whom it may concern:*

Be it known that I, JOHN W. SMITH, a citizen of the United States, residing at Holgate, in the county of Henry and State of Ohio, have invented a new and useful Nut-Lock, of which the following is a specification.

This invention relates to improvements in nut-locks.

The object of the present invention is to improve the construction of nut-locks and to provide a simple, inexpensive, and efficient one adapted for use on railroads, machinery, and other constructions subject to vibration and where it is adapted to prevent a nut from accidentally unscrewing and capable of absolutely locking a nut on a bolt.

A further object of the invention is to provide such a nut-lock which will permit a nut to be readily removed by a wrench without injuring it or the bolt.

The invention consists in the construction and novel combination and arrangement of parts, as hereinafter fully described, illustrated in the drawings, and pointed out in the claims hereto appended.

Figure 2:
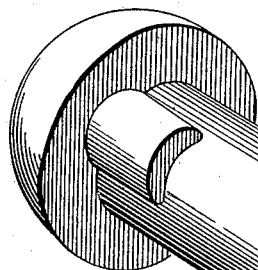
Figure 3:
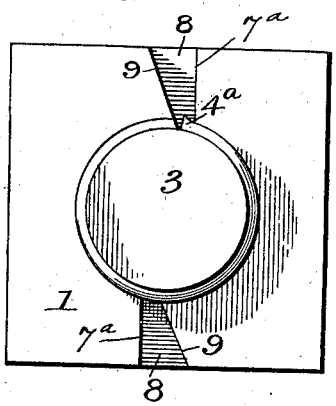

In the drawings, Figure 1 is a perspective view of a nut-lock constructed in accordance with this invention. Fig. 2 is an end elevation, the bolt being in section. Fig. 3 is an elevation illustrating a modification of the invention.

Like numerals of reference designate corresponding parts in the several figures of the drawings.

1 designates a nut provided in its outer face at opposite sides of the bolt-opening with recesses 2, extending inward from the outer faces of the nut to the bolt-opening, to expose the threads of a bolt 3 and enable portions of the said threads to be raised by means of a hammer and chisel for forming a spur or lug 4, which operates as a stop to prevent the nut from unscrewing. The spur or lug 4, which is formed by a clean cut or gash, has a shoulder at one side and a bevel edge at the other side, and the shoulder is arranged to be engaged by the front or forward edge or face 6 of the recess 2, whereby an absolute lock for the nut is provided. The recesses 2, which incline forward or in the direction of the rotation of the nut to screw the latter on the bolt, are disposed at a convenient angle for the chisel to raise the threads, and when it is desired to remove the nut it is rotated forward by a wrench a short distance to bring the rear edge or face 7 of the recess 2 in contact with the spur or lug and cause the same to be depressed and returned to its original position flush with the adjacent portions of the threads in order that the nut may be unscrewed without obstruction and without injuring it or the bolt.

A plurality of recesses is especially desirable for nuts that are to be employed on rail-joints and similar places where it is difficult to get at a bolt and where it is desirable or necessary that a recess should be at the top of the bolt when the latter is screwed up to the necessary degree. In the accompanying drawings two recesses are provided, but it will be readily apparent that more may be used, if desired.

In Fig. 3 of the accompanying drawings is illustrated a slight modification of the invention, in which the spur or lug $4^a$ is disposed in the opposite direction to the spur or lug 4 and the front wall $7^a$ of the recess 8 is arranged substantially parallel with the opposite side edges of the nut and is adapted when the nut is rotated backward to engage the beveled edge of the spur or lug $4^a$. By this construction the nut may be readily unscrewed without first rotating it forward. The rear wall 9 of the recess 8 is arranged at an angle to afford sufficient space for the chisel to engage the bolt.

It will be seen that the nut-lock is simple and effective, that it does not materially increase the cost of bolts and nuts, and that it provides a positive lock for the latter. It will also be apparent that it enables nuts to be readily unscrewed when it is desired to remove them and that the removal of a nut does not injure it or the bolt.

What I claim is—

1. In a nut-lock, the combination of a nut provided in its outer face with a recess having an inclined wall forming a guide for a chisel, and a bolt having a portion of its threads raised to provide a spur or lug, said spur or lug having a shoulder at one side and a beveled face at the other to lock the nut against rotation and to enable the same to be forced over it when rotated by a wrench in the proper direction, substantially as described.

2. In a nut-lock, the combination of a nut provided with an inclined recess, and a bolt having a portion of its threads raised to provide a spur or lug, said spur or lug having a beveled face at one side and a shoulder at the other, the shoulder being disposed opposite the front face of the recess to lock the nut positively against retrograde rotation, whereby the said nut must be first rotated forward and then backward to remove it, substantially as described.

In testimony that I claim the foregoing as my own I have hereto affixed my signature in the presence of two witnesses.

JOHN W. SMITH.

Witnesses:
  B. W. JUSTUS,
  R. W. HUDSON.